United States Patent
Hasegawa et al.

(10) Patent No.: US 8,520,136 B2
(45) Date of Patent: Aug. 27, 2013

(54) SMALL INDUSTRIAL ELECTRONIC IMAGING CAMERA

(75) Inventors: Naoshi Hasegawa, Hino (JP); Shuji Honma, Hino (JP); Sayaka Asami, Hino (JP); Masayoshi Yamaguchi, Joetsu (JP); Eiichi Harada, Fuchu (JP)

(73) Assignee: Toshiba Teli Corporation, Hino-shi (JP)

( * ) Notice: Subject to any disclaimer, the term of this patent is extended or adjusted under 35 U.S.C. 154(b) by 1 day.

(21) Appl. No.: 13/397,379

(22) Filed: Feb. 15, 2012

(65) Prior Publication Data

US 2012/0147259 A1    Jun. 14, 2012

Related U.S. Application Data

(63) Continuation of application No. PCT/JP2010/072799, filed on Dec. 17, 2010.

(30) Foreign Application Priority Data

Dec. 25, 2009  (JP) .................................. 2009-296193

(51) Int. Cl.
 *H04N 5/225*   (2006.01)
(52) U.S. Cl.
 USPC ........................................................ 348/373
(58) Field of Classification Search
 USPC ................ 348/373, 374, 82, 151; 206/316.2;
 294/139; 353/242; 396/541, 535–537
 See application file for complete search history.

(56) References Cited

U.S. PATENT DOCUMENTS

| | | | | |
|---|---|---|---|---|
| 4,937,675 A | * | 6/1990 | Starceski et al. | 348/373 |
| 5,115,263 A | * | 5/1992 | Bernhardt et al. | 348/373 |
| 5,221,964 A | * | 6/1993 | Chamberlain et al. | 348/373 |
| 2009/0073308 A1 | * | 3/2009 | Bleau et al. | 348/373 |
| 2010/0188565 A1 | * | 7/2010 | Tanaami | 348/374 |
| 2010/0245660 A1 | * | 9/2010 | Saitoh | 348/373 |
| 2011/0123189 A1 | * | 5/2011 | Saito | 396/535 |

FOREIGN PATENT DOCUMENTS

| | | |
|---|---|---|
| EP | 0641047 A1 | 3/1995 |
| JP | 5-207342 A | 8/1993 |
| JP | 5-304625 A | 11/1993 |
| JP | 07-162724 A | 6/1995 |

(Continued)

OTHER PUBLICATIONS

European Search Report mailed Jan. 18, 2013, issued in corresponding European Application No. 10839319.0, filed Dec. 17, 2010, 7 pages.

International Search Report mailed Feb. 8, 2011, issued in corresponding International Application No. PCT/JP2010/072799, filed Dec. 17, 2010, 1 page.

(Continued)

*Primary Examiner* — Sinh Tran
*Assistant Examiner* — Jason Flohre
(74) *Attorney, Agent, or Firm* — Christensen O'Connor Johnson Kindness PLLC

(57) ABSTRACT

A lens mount, a board mount frame, a tri-face cover, and a connector metal bracket attached with an external interface connector which are constitutive elements forming a box-type camera housing are respectively a housing constitutive element common to a back-cable-lead assembly structure and a side-cable-lead assembly structure. The box-type camera housing having a four-piece structure in which a capable of providing an external interface connector in an arbitrary face among five faces as targets excepting a front face is achieved by the lens mount, the board mount frame, the tri-face cover, and the connector metal bracket attached with the external interface connector.

5 Claims, 16 Drawing Sheets

(56) References Cited

FOREIGN PATENT DOCUMENTS

| | | |
|---|---|---|
| JP | 2001-274570 A | 10/2001 |
| JP | 2003-46815 A | 2/2003 |
| JP | 2010091735 A | 4/2010 |

OTHER PUBLICATIONS

Korean Patent Office Notification for Filing Opinion mailed May 2, 2013, issued in corresponding Korean Patent Application No. 2012-7005540, filed Dec. 17, 2010, 6 pages.

* cited by examiner

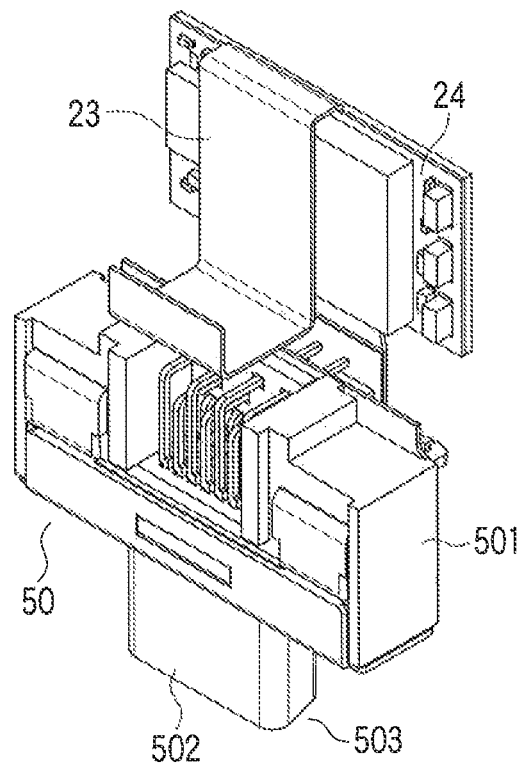
F I G. 4B

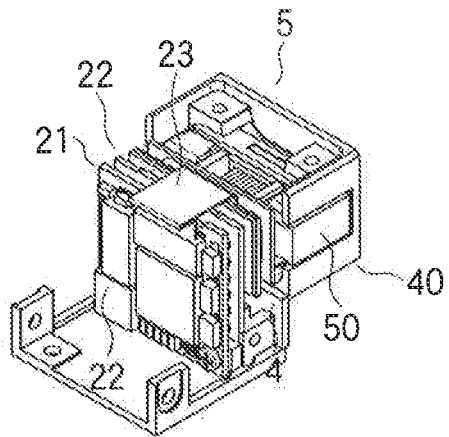
F I G. 11A
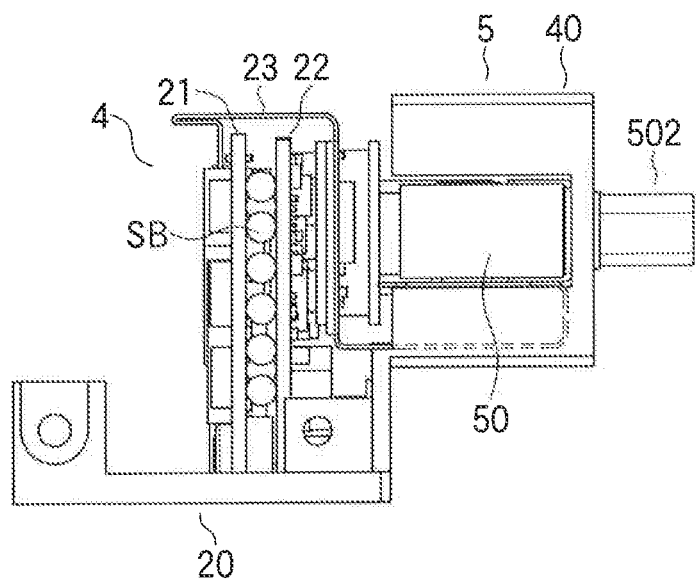
F I G. 11B

SMALL INDUSTRIAL ELECTRONIC IMAGING CAMERA

CROSS REFERENCE TO RELATED APPLICATIONS

This application is a Continuation Application of PCT Application No. PCT/JP2010/072799, filed Dec. 17, 2010 and based upon and claiming the benefit of priority from prior Japanese Patent Application No. 2009-296193, filed Dec. 25, 2009, the entire contents of all, of which are incorporated herein by reference.

BACKGROUND OF THE INVENTION

1. Field of the Invention

The present invention relates to a small industrial electronic imaging camera which comprises a connection mechanism for an external interface cable, which is preferably applied to a machine vision system.

2. Description of the Related Art

An industrial electronic imaging camera which comprises a connection mechanism (external interface connector) for an external interface cable and is applied to a machine vision system can relatively easily achieve a cable lead structure for a camera capable of leading an external interface cable from a desired arbitrary direction, by maintaining spaces for mounting the external interface connectors at a plurality of portions in a housing, when a housing structure of a camera body has extra spaces for installing camera components.

However, for example, in a small electronic imaging camera having a box-type housing structure whose edges each are approximately 20 to 30 mm long, i.e., a so-called microcamera in a machine vision system, a large space is occupied by external interface connectors in the housing, and spaces for mounting external interface connectors are therefore difficult to maintain at a plurality of portions in the housing. Accordingly, an external interface connector is provided and fixed to one portion of the housing. A specific example will be an external interface connector provided in a back face (rear face) part of a box-type camera housing in a manner that an external interface cable is led from the back face (rear face) of the box-type camera housing. Therefore, according to the prior art, the external interface cable has to be led in one fixed leading direction, and the leading direction of the cable cannot be changed. Therefore, for example, a degree of freedom is insufficient for changing camera configuration settings, such as a change of camera mounting positions, a change of a monitoring target, and a change of a camera configuration. Further, since a position for attaching the external interface connector is fixed, there is a problem in general versatility of products. If an attempt is made to allow a cable to be led from an arbitrary housing face among a plurality of faces of a box-type camera housing, a plurality of sets of construction components of the housing need be prepared and cause a problem in view of management of components and economy.

There is a video camera in which a connector pivot mechanism which can be pivoted about two axes perpendicular to an outer housing is provided as a variable mechanism which can change a cable leading direction of the camera so as to provide a degree of freedom for a cable connection direction of a connector (see Patent Literature 1). Although the video camera provided with the connector pivot mechanism allows the cable leading direction to be changed, a mechanism which pivotally supports a connector provided with wires is complex and causes a problem in economy and reliability. Further, when the video camera is applied to a microcamera having a box-type camera housing structure as described above, mount spaces for the mechanism are difficult to maintain. Further, even if a leading direction of the cable is variable, mounting parts of the connector is fixed to a predetermined position of the housing, and causes a problem in a degree of freedom and general versatility as described above.

CITATION LIST

Patent Literature

PTL 1: Jpn. Pat. Appln. KOKAI Publication No. 5-207342

BRIEF SUMMARY OF THE INVENTION

Technical Problem

As has been described above, a prior art small electronic imaging camera for machine vision, suffers from a poor degree of freedom in changing camera configuration settings and causes a problem in general versatility as a product.

The present invention has been made in view of circumstances as described above.

Solution to Problem

One embodiment of the present invention is a small industrial electronic imaging camera comprising: a lens mount which comprises an imaging window and forms a front face part of a box-type camera housing having a hexahedral structure; a tri-face cover having a rectangular U-shaped cross-section and which can be attached to the lens mount with edges switched in relation to edges of the lens mount about a vertical axis parallel to an optical axis of the imaging window, and forms arbitrary three side face parts of the camera housing or forms arbitrary two side face parts and a back face part of the camera housing; a board mount frame which comprises a board mount mechanism containing and supporting a plurality of boards in an imaging chamber formed in the camera housing, and is attached to the lens mount thereby forming an arbitrary face part of the camera housing; a connector metal bracket which is attached to the lens mount and forms an arbitrary side face part or the back face part of the camera housing; and an external interface connector which comprises an external connection terminal for connecting an external interface cable, and is attached to the connector metal bracket, with the external connection terminal exposed to outside of the connector.

Advantageous Effects of Invention

According to the invention, there is provided a small industrial electronic imaging camera comprising a connection mechanism for an external interface cable with high general versatility, which can be easily assembled with a leading direction of the external interface cable arbitrarily selected with an economically advantageous configuration.

Further, according to the invention, a mount face to which an external interface connector is attached can be changed to an arbitrary face (back, right, left, upper, or lower face) among five faces of a box-type camera housing except for a front face (lens mount face). In this mariner, an external interface cable can be led in en arbitrary direction from a camera housing among five directions of back leading which is parallel to the camera optical axis, and right leading, left leading, upper leading, and lower leading which are perpendicular to the camera optical axis.

BRIEF DESCRIPTION OF THE SEVERAL VIEWS OF THE DRAWING

FIG. 4B is a perspective view showing a part of the camera assembly structure (built in) shown in FIG. 2;

FIG. 11A is an exploded perspective view showing the assembly procedure where the external interface cable is led from the back face part of the housing, according to the embodiment;

FIG. 11B is an exploded perspective view showing the assembly procedure where the external interface cable is led from the back face part of the housing, according to the embodiment;

DETAILED DESCRIPTION OF THE INVENTION

Hereinafter, an embodiment of the invention will be described with reference to the drawings.

Figure 1:
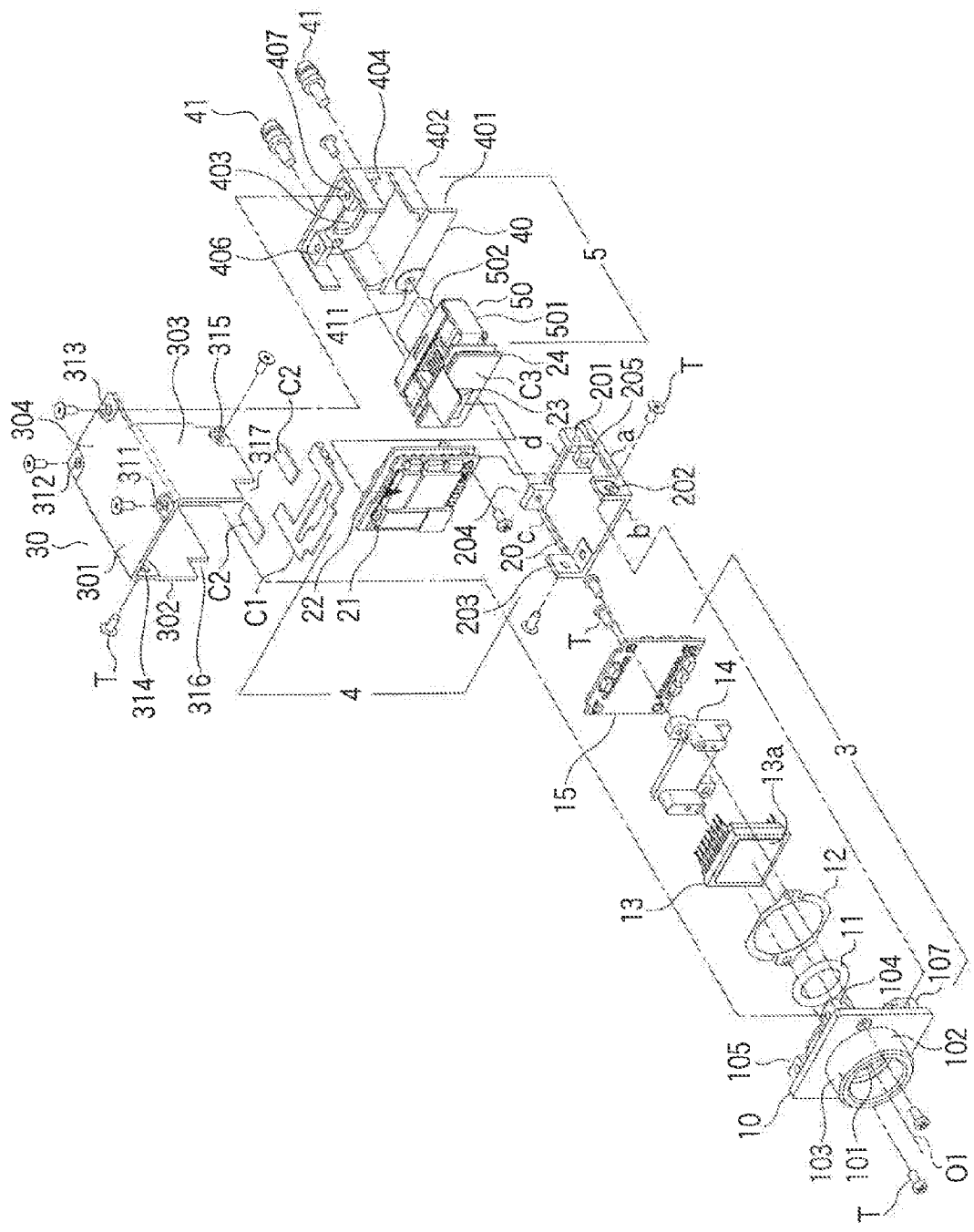
FIG. 1 is an exploded perspective view showing a camera assembly structure according to an embodiment of the invention where an external interface cable is led from a back face part of a housing.
Figure 2:
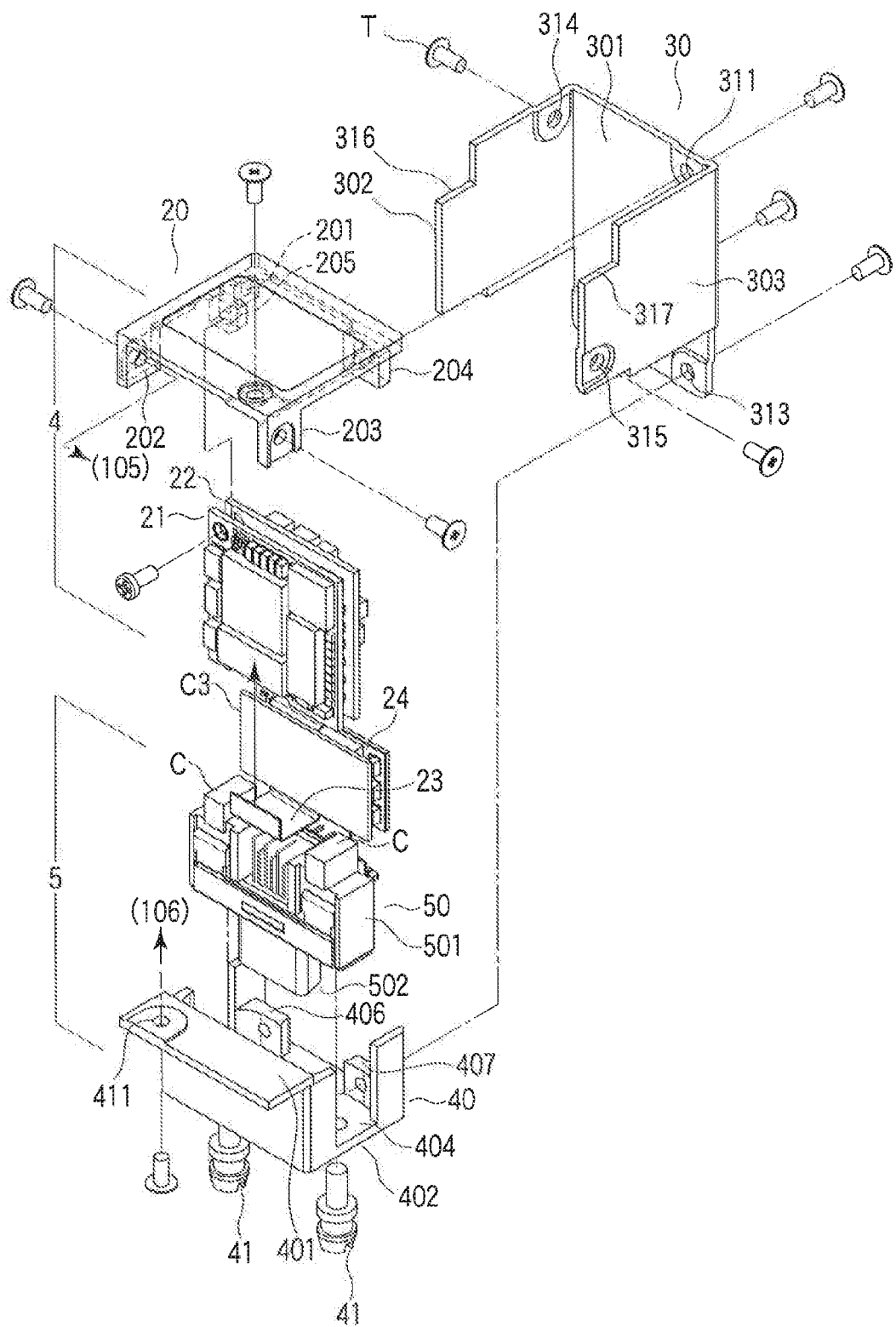
FIG. 2 is a perspective view showing a part of the camera assembly structure according to the embodiment, where the external interface cable is led from a side face part (upper face part/lower face part/left face part/right face part) of the housing (assembly structure excepting a lens mount built-in module)

FIGS. 1, 2, 3A, and 4A show a camera assembly structure of a small industrial electronic imaging camera according to an embodiment of the invention. FIG. 1 (exploded perspective view) and FIG. 3A (side cross-sectional view) show the assembly structure when an external interface connector is provided at a back face part (rear face part) of a box-type camera housing having a hexahedral structure, to lead an external interface cable from the back face part of the box-type camera housing. FIG. 2 (partial exploded perspective view) and FIG. 4A (side cross-sectional view) show an assembly structure when an interface connector is provided at an arbitrary side face part (any one of upper, lower, left, and right, face parts) of the box-type camera housing, to lead an external interface cable from the side face part of the box-type camera housing. In the following, the camera assembly structure shown in FIGS. 1 and 3A will be referred to as a backcable-lead assembly structure, and the camera assembly structure shown in FIGS. 2 and 4A will be referred to as a side-cable-lead assembly structure.

As shown in FIGS. 1, 2, 3A, and 4A, the small industrial electronic imaging camera comprises a lens mount 10, a tri-face cover 30, a board mount frame 20, a connector metal bracket 40, and an external connection terminal 51. The lens mount 10 comprises an imaging window 101 and forms a front face part of the box-type camera housing 1 having a hexahedral structure. The tri-face cover 30 having a rectangular U-shaped cross-section can be attached to the lens mount 10, with edges of the tri-face cover 30 position switched relatively to edges of the lens mount 10 around a vertical axis parallel to an optical axis O1 of the imaging window 101. The tri-face cover 30 forms arbitrary three side faces or two side faces and rear face of the camera housing 1. The board mount frame 20 comprises a board mount mechanism 205 which contains and supports a plurality of boards in an imaging chamber 2 formed in the camera housing 1. The board mount frame 20 is attached to the lens mount 10 and forms an arbitrary side face of the camera housing 1. The connector meal bracket 40 is attached to the lens mount 10 and thereby forms an arbitrary side face of the camera housing 1 or a back face of the camera housing 1. The external interface connector 50 comprises an external connection terminal 51 for connecting an external interface cable, and is attached with the connector metal bracket 40 with the external connection terminal 51 exposed to outside of the housing.

The lens mount 10, the board mount frame 20, the tri-face cover 30, and the connector metal bracket 40 attached with the external interface connector 50, which are constitutive elements of the box-type camera housing 1, are components forming the housing, which are common to both the back-cable-lead assembly structure and the side-cable-lead assembly structure. The box-type camera housing 1 having a four-piece structure according to the invention, in which an external interface connector can be provided in an arbitrary face among five faces excepting the front face, can be constructed by the lens mount 10, board mount frame 20, the tri-face cover 30, and the connector metal bracket 40 attached with the external interface connector 50.

Figure 3A:
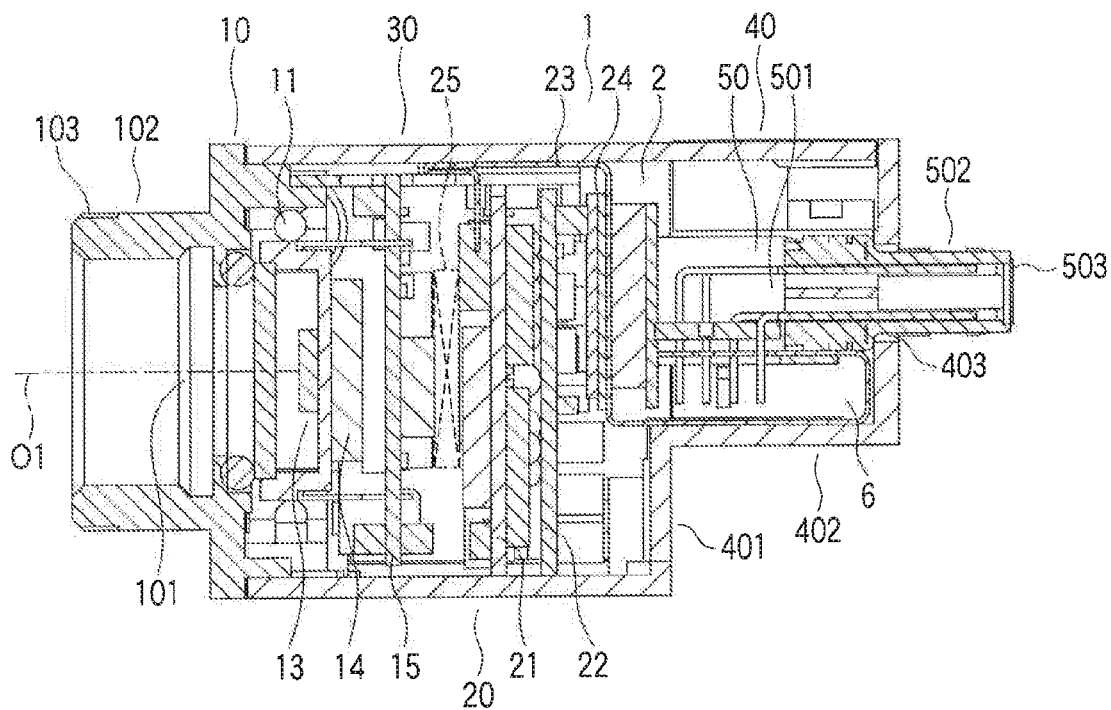
FIG. 3A is a side cross-sectional view showing the camera assembly structure (built in) shown in FIG. 1.
Figure 3B:
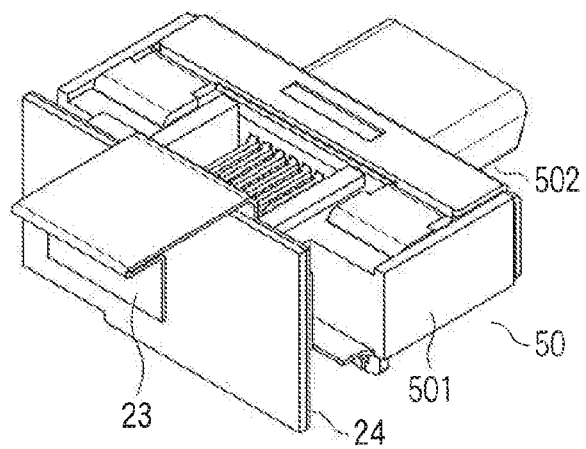
FIG. 3B is a perspective view showing a part of the camera assembly structure (built in) shown in FIG. 1.
Figure 4A:
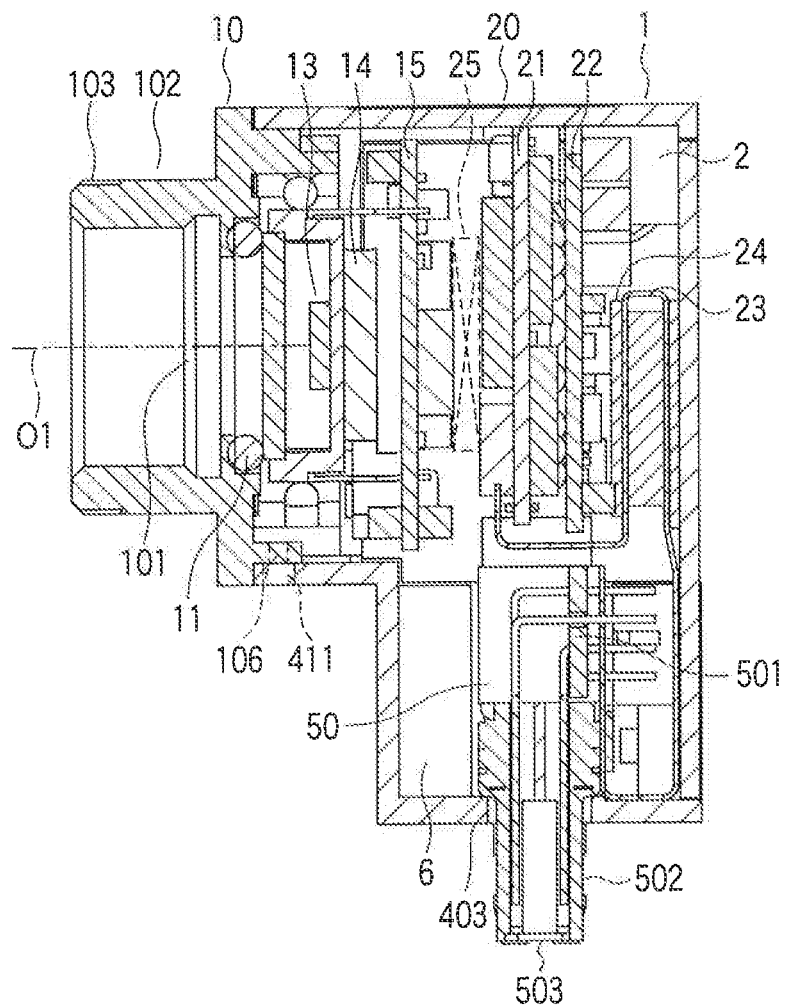
FIG. 4A is a side cross-sectional view showing the camera assembly structure (built in) shown in FIG. 2.

Between the back-cable-lead assembly structure shown in FIGS. 1 and 3A and the side-cable-lead assembly structure shown in FIGS. 2 and 4A, as is apparent from comparison between the figures, directions of an external connection terminal 502 led from a connector-terminal lead hole 403 are vertically reversed to each other in relation to the connector metal bracket 40 as shown in FIGS. 3B and 4B. Accordingly, a direction of a terminal array of a connection end surface 503 of an external connection terminal 502 is reversed as well.

In the box-type camera housing 1 according to the embodiment of the invention, a cable connection direction of the external connection terminal 502 provided on the external interface connector 50 is parallel to the optical axis O1 (i.e., a connection end surface 503 of the external connection terminal 502 is perpendicular to the optical axis O1), in the back-cable-lead assembly structure in which the connector metal bracket 40 forms the back face part of the camera housing 1. In the side-cable-lead assembly, the connector metal bracket 40 forms any of the right, left, upper, and lower side face parts of the camera housing 1, the cable connection direction of the external connection terminal 502 is perpendicular to the optical axis O1 (i.e., the connection end surface 503 of the external connection terminal 502 is parallel to the optical axis O1).

In the back-cable-lead assembly structure in which the connector metal bracket 40 forms the back face part of the camera housing 1, the connector metal bracket 40 is fixed with screws to the lens mount 10 through the board mount frame 20 and is also fixed with screws to the lens mount 10 through the tri-face cover 30, as shown in FIGS. 1 and 3A. In the side-cable-lead assembly in which the connector metal bracket 40 forms any of the right, left, upper, and lower side face parts of the camera housing 1, the connector metal bracket 40 is fixed with screws directly to the lens mount 10 and is fixed with screws to the lens mount 10 through the tri-face cover 30 and board mount frame 20, as shown in FIGS. 2 and 4A. Screws T used for the screw-fixing are partially omitted from the figures.

The lens mount 10 is configured to comprise a lens frame part 102 and screw fixing pieces 104, 105, 106, and 107. The lens frame part 102 is added with a top mark 103 around an imaging window 101 in a face part exposed to outside. The screw fixing pieces are provided at corners on four edges of the back face part, and each comprise two screw holes (threaded holes) which are parallel to two edges perpendicular to each other. The lens mount 10, the board mount frame 20, the tri-face cover 30, and the connector metal bracket 40 attached with the external interface connector 50 are fixed with screws to each other through the eight screw holes in the fixing pieces 104, 105, 106, and 107. In this manner, the assembly structures of the box-type camera housing 1 are formed with the imaging chamber 2 formed therein. The top mark 103 always clearly indicates up and down directions of imaging planes (described later) of a solid-state imaging element for the assembly structures. The top mark 103 is cut in the lens frame part 102.

The board mount frame 20 comprises two engaging pieces 202 and 203, two screw fixing pieces 201 and 204, and a board fixing piece 205. The two engaging pieces 202 and 203 each comprise a face part exposed to outside where a face plate is bonded, and comprise a back face part where a screw insertion hole is cut. Two screw-fixing pieces 201 and 204 respectively comprise screw holes (threaded holes). The board fixing piece 205 forms the board mount mechanism. The engaging piece 202 is provided at a corner on an edge a in a side of an edge b, and the engaging piece 203 is provided at a corner on an edge c in a side of edge b. Screw fixing holes are cut in a direction parallel to edge b in the engaging pieces 202 and 203. The screw fixing piece 201 is provided at a corner on an edge d in a side of edge c. A screw hole in a direction perpendicular to edge a is cut in the screw fixing piece 201, and a screw hole in a direction perpendicular to edge d is cut in the screw fixing piece 204. The board fixing piece 205 is provided on the edge a, and a screw hole is provided in a direction parallel to the edge a.

The screw-fixing piece 201 engages with a screw-fixing hole 315 in the tri-face cover 30 in the back-cable-lead assembly structure, and engages with the screw-fixing hole 314 in the tri-face cover 30 in the case of the side-cable-lead assembly structure. The engaging piece 202 is fixed with screws to a screw-fixing piece 107 in the lens mount 10 in the back-cable-lead assembly structure, and is fixed with screws to a screw-fixing piece 105 in the lens mount 10 in the side-cable-lead assembly structure. The engaging piece 203 is fixed with screws to a screw-fixing piece 106 the lens mount 10 in the back-cable-lead assembly structure, and is fixed with screws to a screw-fixing piece 104 in the lens mount 10 in the side-cable-lead assembly structure. The screw fixing piece 204 engages with a screw fixing hole 411 in the connector metal bracket 40 in the back-cable-lead assembly structure, and engages with the screw fixing hole 311 in the tri-face cover 30 in the side-cable-lead assembly structure.

The tri-face cover 30 is formed of an intermediate (or central) face part 301 and side face parts 302 and 303 in two sides, to have a rectangular U-shaped cross section. End edges at one end of the rectangular U-shape cross-section are in the same plane as each other. Another end edge of the intermediate face part 301 is protruded (extended) from the end edges of the two sides. The protruded face part (extended part) 304 forms a cover of an extended part 402 (connector container chamber 6) and a mount piece (piece fixed with screws to the connector metal bracket 40) of the connector metal bracket 40.

The screw-fixing hole 311 is cut at The intermediate face part 301 of the tri-face cover 30 on one end edge in a side of the face part 303. Screw fixing holes 312 and 313 are cut at both corners of the intermediate face part 301 of the tri-face cover 30 on another end edge. Of the face parts 302 and 303 in the two sides, a screw fixing hole 314 is cut at a corner of the face part 302 in a side of the face part 301, and a screw fixing hole 315 is cut at an end of the face part 303 in the side of the another end edge. Termination ends of the face parts 302 and 303 in the one end edge in two sides of the tri-face cover 30 form notch parts 316 and 317 which engage with engaging pieces 202 and 203 provided on the board mount frame 20.

The screw fixing hole 311 is fixed with a screw to the screw fixing piece 104 in the lens mount 10 in the back-cable-lead assembly structure, and is fixed with a screw to the screw fixing piece 204 on the board mount frame 20 in the side-cable-lead assembly structure. The screw fixing holes 312 and 313 are fixed with screws to the screw fixing pieces 406 and 407 on the connector metal bracket 40. The screw fixing hole 314 is fixed with a screw to the screw fixing piece 105 on the lens mount 10 in the back-cable-lead assembly structure, and is fixed with a screw to the screw fixing piece 201 on the board mount frame 20 in the side-cable-lead assembly structure.

The connector metal bracket 40 comprises a mount piece 401, an extended part 402, a connector-terminal lead hole 403 and a connector support part 404, and forms the connector container chamber 6 which contains a body part (connector body) 501 of the external interface connector 50 in the extended part 402.

A screw fixing hole 411 is cut in the bracket fixing piece 401. The screw fixing hole 411 is fixed with a screw to the screw fixing piece 204 of the board mount frame 20 in the back-cable-lead assembly structure, and is fixed with a screw to any of the screw fixing pieces 104, 105, 106, and 107 in the side-cable-lead assembly structure. The extended part 402 extended from the bracket fixing piece 401 forms a support frame part of a connector. The extended part 402 is provided with a connector-terminal lead hole 403 in an extended face parallel to a mount face of the bracket fixing piece 401, and leads the external connection terminal 502 of the external interface connector 50 to outside. Connector support parts 404 which engage with and support a connector body 501 are provided in two sides of the connector-terminal lead hole 403. Screw fixing pieces 406 and 407 which fix, with screws, the screw fixing holes 312 and 313 provided in a protruded face part 304 of the tri-face cover 30 are provided in an extended end of the extended part 402.

The external interface connector 50 is fixed to the connector metal bracket 40 by a pair of clamp screws 41 with lock terminals. The clamp screws 41 with lock terminals each comprise a plug-clamp lock terminal for fastening a plug (connector) to the external connection terminal 502 when a connection plug (connector) of an un-illustrated external interface cable is interface-connected to the external connection terminal 502 of the external interface connector 50. The external interface connector 50 forms a camera link connector according to a camera link standard.

The imaging chamber 2 formed in the box-type camera housing 1 having a four-piece structure as described above contains a lens-mount built-in module which forms a sensor module, and a frame built-in module 4 which forms a control module. A body part 501 of the external interface connector 50 is contained in the connector container chamber 6 which communicates with the imaging chamber 2 and is formed in the extended part 402. The connector metal bracket 40 and the external interface connector 50 attached to the connector metal bracket 40 form a connector module 5.

The lens-mount built-in module 3 which forms the sensor module comprises a lens mount 10, an O-ring 11, a shim 12 for adjusting a flange back, a solid-state imaging element 13, a device holder 14, and a sensor board (rigid board) 15. The solid-state imaging element 13 comprises a rectangular imaging plane 13a which forms an area image sensor. The device holder 14 holds the solid-state imaging element 13. The sensor board (rigid board) 15 which mounts the solid-state imaging element 13 through the device holder 14.

Among constitutive elements of the lens-mount built-in module 3, the solid-state imaging element 13 comprises a charge-coupled device (CCD) or complementary metal oxide semiconductor (CMOS) image sensor. In the present embodiment, the CCD is employed in the solid-state imaging element 13, and the COD 13 is mounted on the sensor board 15 by the device holder 14. The CCD 13 is fixed to and supported on the sensor board 15 with its position adjusted by the shim 12 in a manner that the rectangular imaging plane 13a is located at a position where a flange back on the optical axis O1 is maintained. The shim 12 for adjusting the flange back is appropriately used upon necessity in optical adjustment work, and is not equipped in some cases. The flange back (FB) is determined by a distance (flange focal distance) to a focus (imaging plane 13a) from, as a reference, an open end (flange face of lens) of the imaging window 101 provided on the lens mount 10.

The lens-mount built-in module 3 is configured by fixing the sensor board 15, which mounts the COD 13 by the device holder 14, with screws to the lens mount 10, with the ring 11 and shim 12 inserted therebetween and with the device holder 14 used as a fixing/support member.

The frame built-in module 4 which forms a control module comprises the board mount frame 20, a control board (rigid board) 21, and a power supply board 22. The control board 21 and the power supply board 22 are layered on each other, are physically integrated by solder balls SB (barrel-type resin-core solder balls), and are circuited and connected to each other, forming a package-on-package (POP) board having a double-board structure.

The POP board comprising the control board 21 and the power supply board 22 is fixed with a screw to the board fixing piece 205, and is supported by and fixed to the board mount frame 20, with the control board 21 and power supply board 22 standing on a surface of the board mount frame 20. In this manner, the frame built-in module 4 forming the control module is constructed.

The connector module 5 and the frame built-in module 4 as described above are disconnectably circuited and connected to each other through a connector by a connector-connection flexible-printed-wiring board (external-interface flexible-printed-wiring board) 23. The frame built-in module 4 and lens-mount built-in module 3 are disconnectably circuited and connected to each other through a connector by a sensor-circuit flexible-printed-wiring board 25. The external-interface flexible-printed-wiring board 23 comprises an IC component 24 for signal processing. The sensor-circuit flexible-printed-wiring board 25 is of a length which allows the board 25 to be folded a plurality of times to the lens-mount built-in module 3, so that the frame built-in module 4 and connector module 5 are pivotably positioned about a vertical axis parallel to the optical axis O1.

FIGS. 5A, 5B, 6A, 6B, 7A, 7B, 8A, 8B, 9A, and 9B show built-in states of the back-cable-lead assembly structure and side-cable-lead assembly structure in the camera assembly structure, and exterior configurations before and after building the structures in the camera assembly structures described above.

Figure 5A:
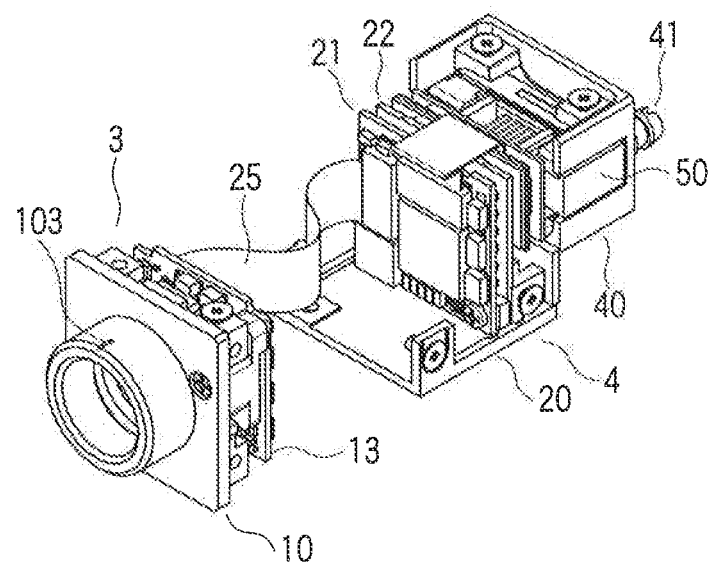
FIG. 5A is a perspective view showing a camera assembly structure (built in) and a built-in state where the external interface cable is led from a back face part of the housing, according to the embodiment.
Figure 5B:
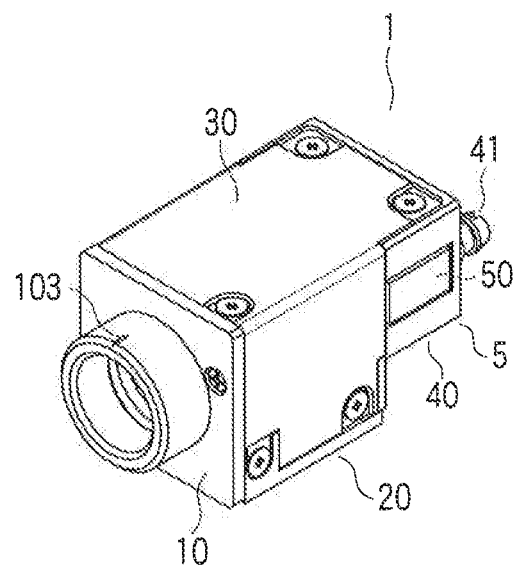
FIG. 5B is a perspective view showing an exterior configuration of a camera assembly structure (assembled) where the external interface cable is led from the back face part of the housing, according to the embodiment.

FIG. 5A shows a built-in state in which the connector module 5 is provided on the back face (rear face) part of the box-type camera housing 1. FIG. 5B shows an exterior configuration thereof after being built in. In this assembly structure (e.g., an assembly structure in which an external interface cable is led from the back face part), the board mount frame 20 forms a bottom face part of the camera housing 1.

Figure 6A:
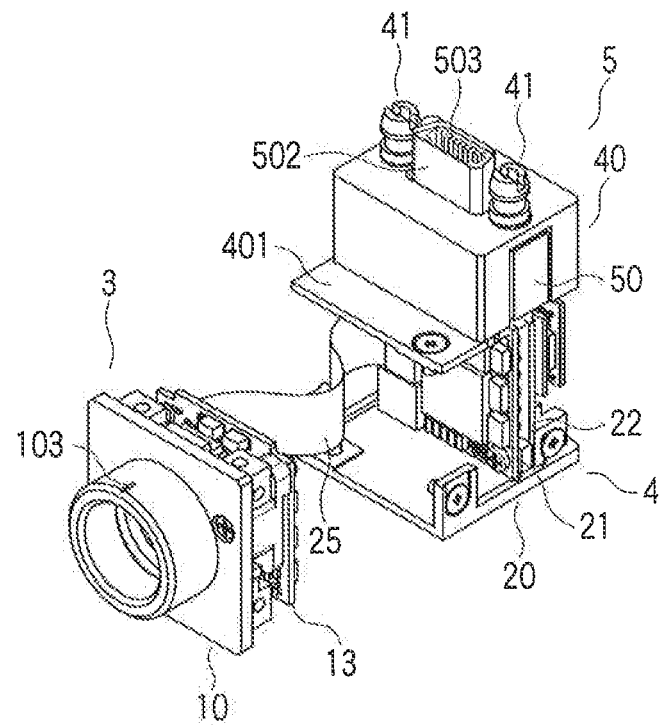
FIG. 6A is a perspective view showing a camera assembly structure and a built-in state where the external interface cable is led from an upper face part of the housing, according to the embodiment.
Figure 6B:
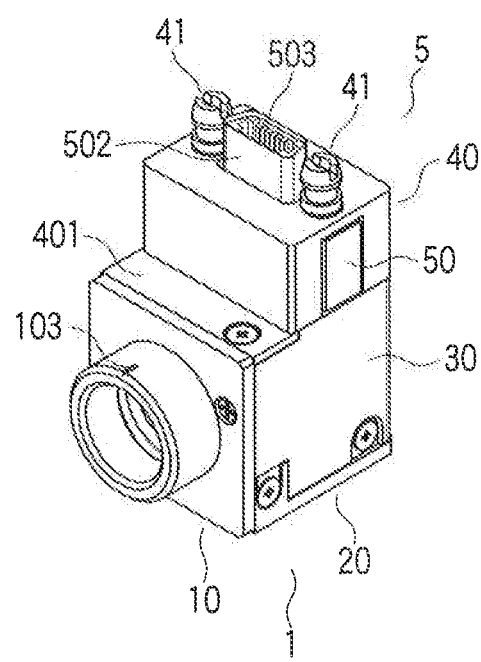
FIG. 6B is a perspective view showing an exterior configuration of a camera assembly structure (assembled) where the external interface cable is led from the upper face part of the housing, according to the embodiment.

FIG. 6A shows a built-in state in which the connector module 5 is provided on the top face (rear face) part of the box-type camera housing 1. FIG. 6B shows an exterior configuration thereof after being built in. In this assembly structure (e.g., an assembly structure in which an external interface cable is led from the top), the board mount frame 20 forms the bottom face part of the camera housing 1, as in the assembly structure shown in FIGS. 5A and 5B.

Figure 7A:
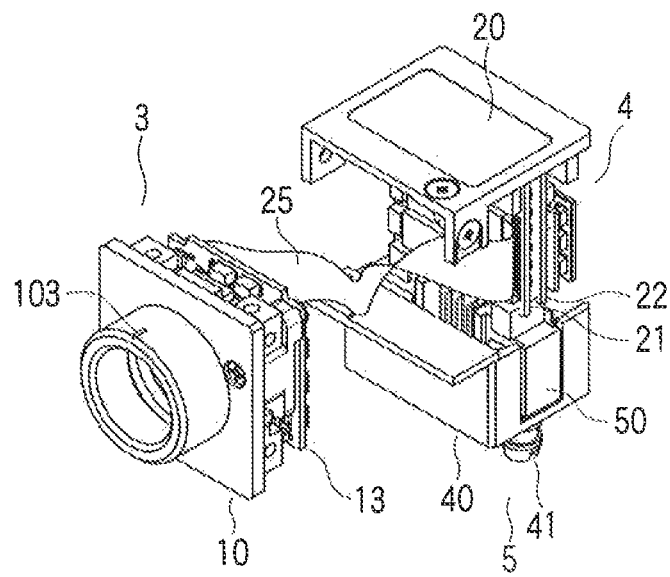
FIG. 7A is a perspective view showing a camera assembly structure and a built-in state where the external interface cable is led from a lower face part of the housing, according to the embodiment.
Figure 7B:
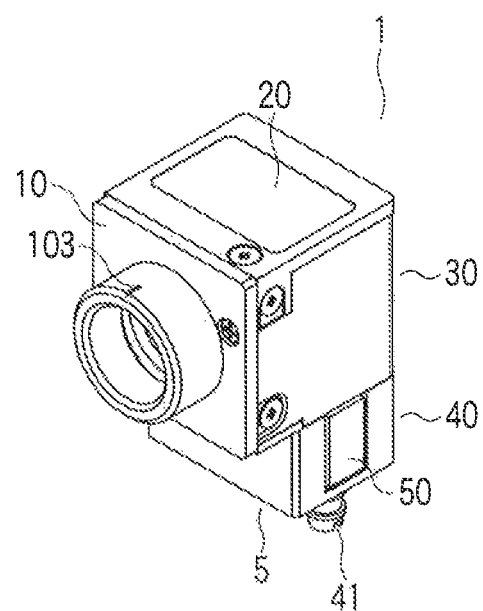
FIG. 7B is a perspective view showing an exterior configuration of a camera assembly structure (assembled) where the external interface cable is led from the lower face part of the housing, according to the embodiment.

FIG. 7A shows a built-in state in which the connector module 5 is provided on a lower face part of the box-type camera housing 1. FIG. 7B shows an exterior configuration thereof after being built in. In this assembly structure (e.g., an assembly structure in which an external interface cable is led from the lower face), the board mount frame 20 forms the top part of the camera housing 1.

Figure 8A:
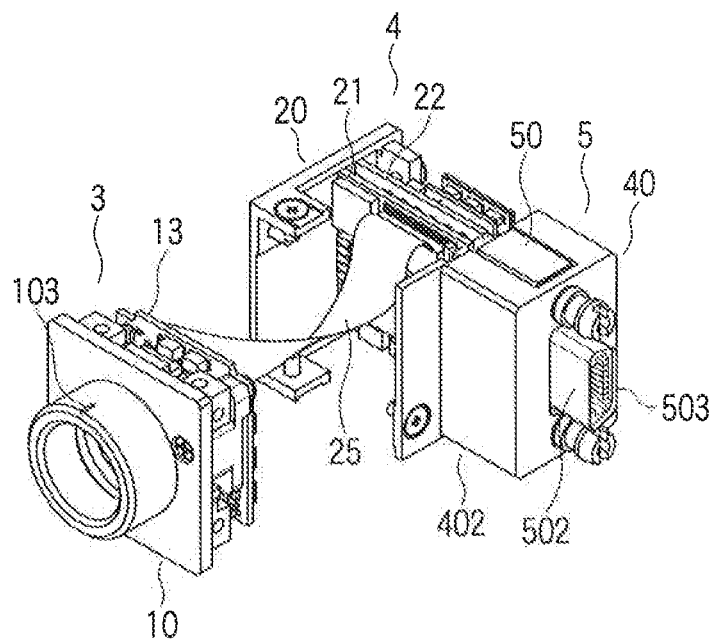
FIG. 8A is a perspective view showing a camera assembly structure and a built-in state where the external interface cable is led from a left face part of the housing, according to the embodiment.
Figure 8B:
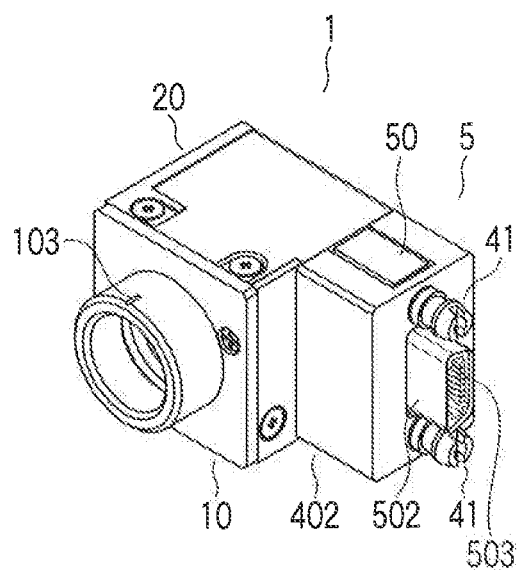
FIG. 8B is a perspective view showing an exterior configuration of a camera assembly structure (assembled) where the external interface cable is led from the left face part of the housing, according to the embodiment.

FIG. 8A shows a built-in state in which the connector module 5 is provided on a left side face part of the box-type camera housing 1. FIG. 8B shows an exterior configuration thereof after being built in. In this assembly structure (e.g., an assembly structure in which an external interface cable is led from a left side face), the board mount frame 20 forms a right face part of the camera housing 1.

Figure 9A:
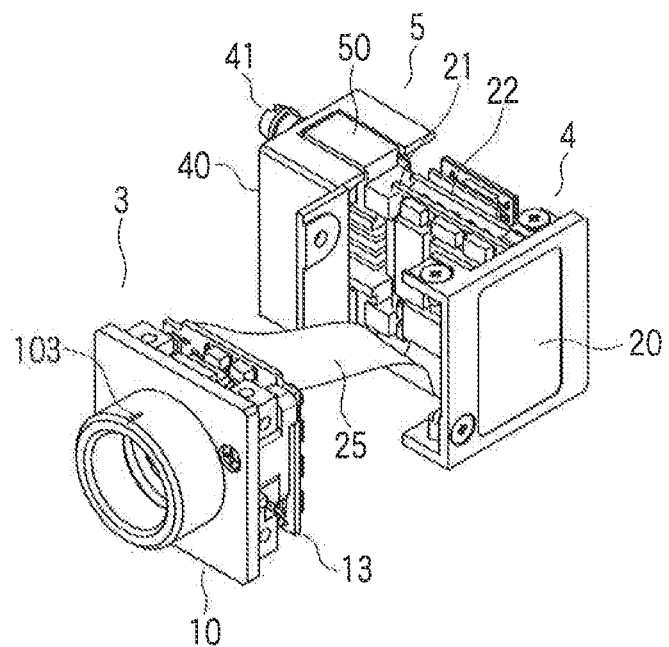
FIG. 9A is a perspective view showing a camera assembly structure and a built-in state where the external interface cable is led from a right face part of the housing, according to the embodiment.
Figure 9B:
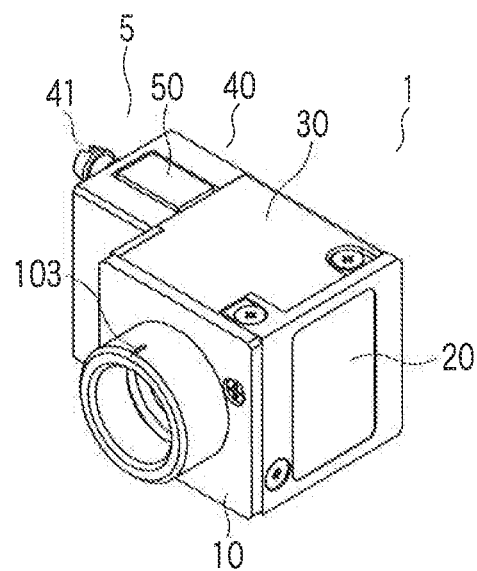
FIG. 9B is a perspective view showing an exterior configuration of a camera assembly structure (assembled) where the external interface cable is led from the right face part of the housing, according to the embodiment.

FIG. 9A shows a built-in state in which the connector module 5 is provided on a right side face part of the box-type camera housing 1. FIG. 9B shows an exterior configuration thereof after being built in. In this assembly structure (e.g., an assembly structure in which an external interface cable is led from a right side face), the board mount frame 20 forms a left side face part of the camera housing 1.

FIGS. 10A, 10B, 11A, 11B, 12A, and 12B show an assembly procedure for assembling the back-cable-lead assembly structure described above. FIGS. 13A, 13B, 14A, 14B, and 15 show an assembly procedure for assembling the side-cable-lead assembly structure.

Figure 10A:
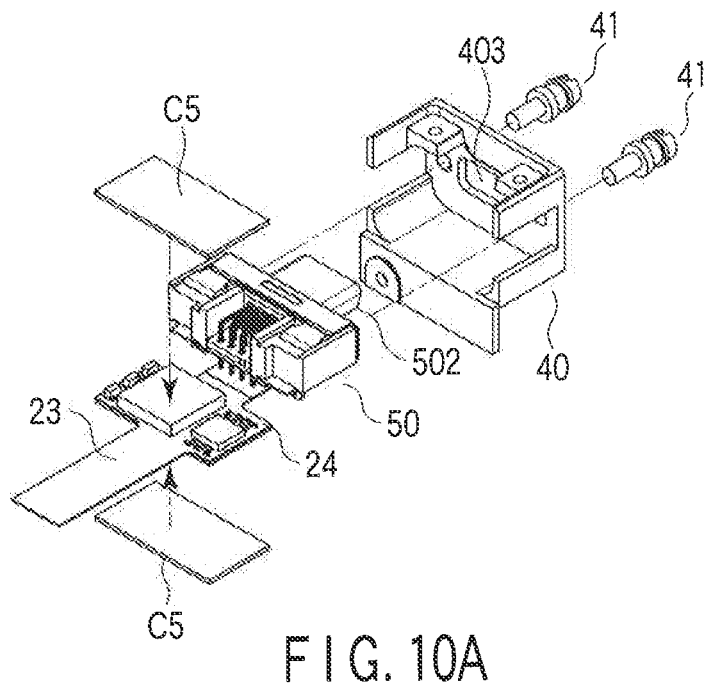
FIG. 10A is an exploded perspective view showing an assembly procedure where the external interface cable is led from a back face part of the housing, according to the embodiment.
Figure 10B:
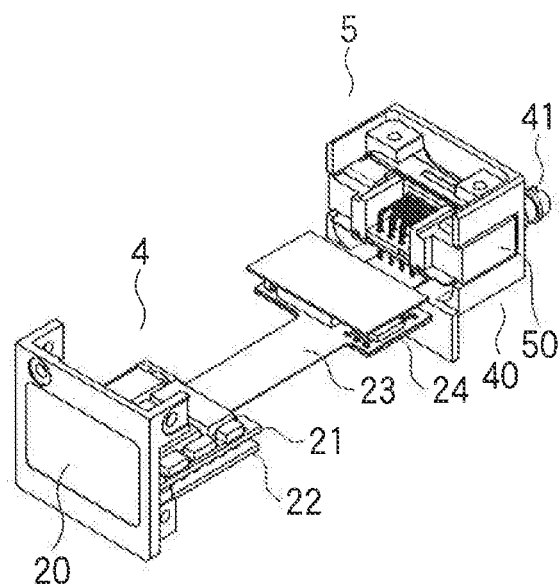
FIG. 10B is an exploded perspective view showing the assembly procedure where the external interface cable is led from the back face part of the housing, according to the embodiment.

In the assembly procedure for assembling the back-cable-lead assembly structure, cushion materials C5 are bonded to two surfaces of the IC component 24 mounted on the external-interface flexible-printed-wiring board 23, as shown in FIG. 10A. Thereafter, the external connection terminal 502 of the external interface connector 50 to which the external-interface flexible-printed-wiring board 23 is soldered is led to outside of the connector container chamber 6 through the connector-terminal lead hole 403 of the connector metal bracket 40. The external interface connector 50 is fixed to the connector metal bracket 40 by the clamp screws 41 with the lock terminals, thereby forming the connector module 5. Further, as shown in FIG. 10B, the external-interface flexible-printed-wiring board 23 is connected by a connector to the control board 21 of the frame built-in module 4.

Figure 12A:
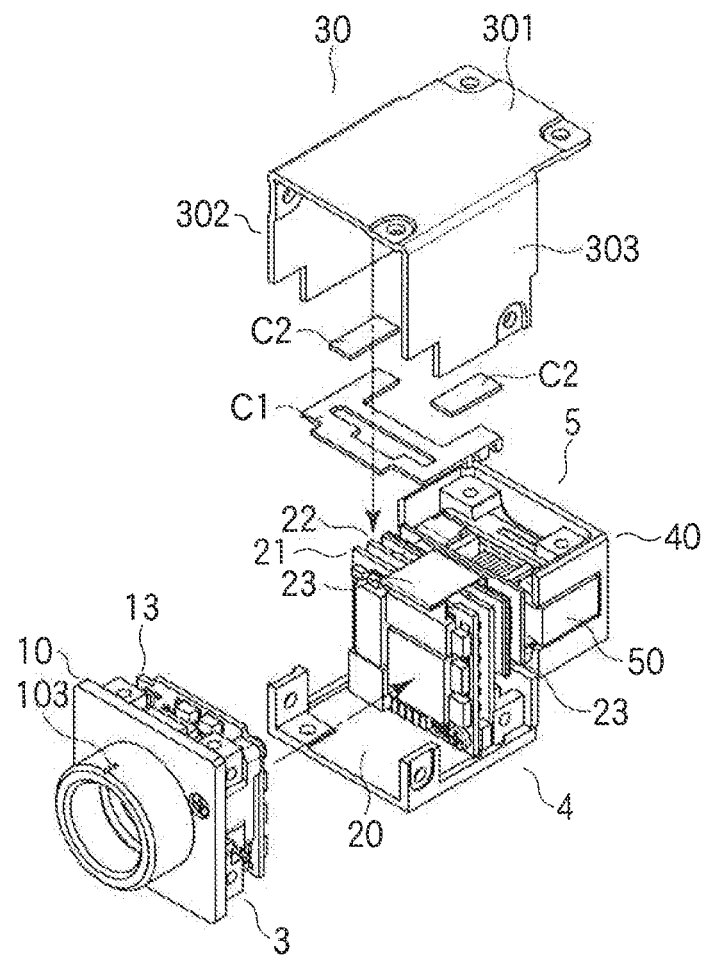
FIG. 12A is an exploded perspective view showing the assembly procedure where the external interface cable is led from the back face part of the housing, according to the embodiment.

Subsequently, the external-interface flexible-printed-wiring board 23 to which the frame built-in module 4 and connector module 5 are circuited and connected is folded as shown in FIGS. 11A and 11B, and the connector metal bracket 40 is engaged with the board mount frame 20. Thereafter, as shown in FIG. 12A, the lens-mount built-in module is mounted in the frame built-in module 4. Then, the tri-face cover 30 is fixed with screws to the lens-mount built-in module 3, frame built-in module 4, and connector module 5, with the cushion materials C1 and C2 inserted therebetween. In a step of building the lens-mount built-in module 3 into the frame built-in module 4, the sensor-circuit flexible-printed-wiring board 25 is folded and contained between the sensor board 15 and the control board 21, as shown in FIGS. 3A and 5A.

Figure 12B:
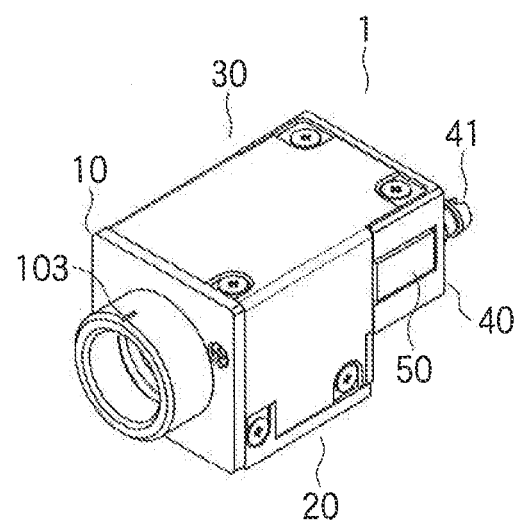
FIG. 12B is a perspective view showing an exterior configuration of a camera assembly structure (assembled) where the external interface cable is led from the right face part of the housing, according to the embodiment.

In this manner, the small industrial electronic imaging camera having the back-cable-lead assembly structure as shown in FIG. 12B is constructed (refer to FIG. 5B).

Figure 13A:
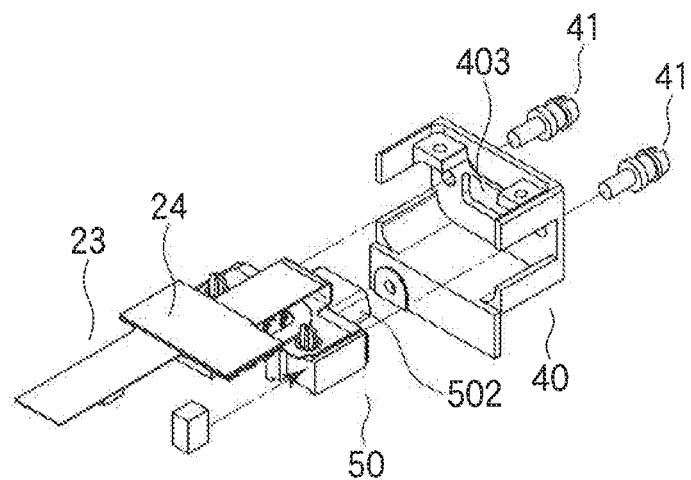
FIG. 13A is an exploded perspective view showing an assembly procedure where the external interface cable is led from a face part of the housing (upper face part/lower face part/left face part/right face part), according to the embodiment.
Figure 13B:
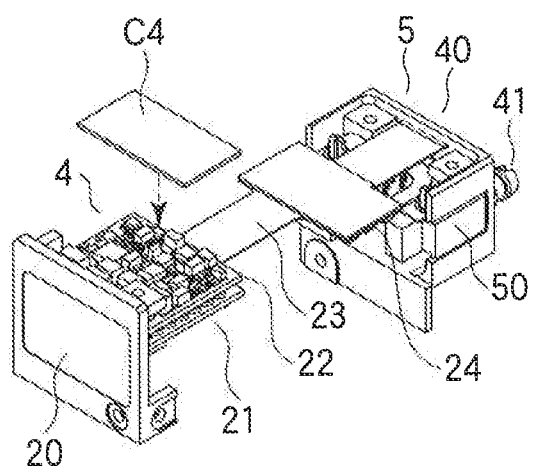
FIG. 13B is an exploded perspective view showing the assembly procedure where the external interface cable is led from the face part of the housing (upper face part/lower face part/left face part/right face part), according to the embodiment.

In the assembly procedure for assembling the side-cable-lead assembly structure, as shown in FIG. 13A, the external connection terminal 502 of the external interface connector 50 to which the external-interface flexible-printed-wiring board 23 is soldered is led to outside of the connector container chamber 6 through the connector-terminal lead hole 403. The external interface connector 50 is fixed with the clamp screws 41 with lock terminals to the connector metal bracket 40, thereby forming the connector module 5. Between the side-cable-lead assembly structure and the back-cable-lead assembly structure, directions of the external connection terminal 502 to be inserted into the connector-terminal lead hole 403 are vertically reversed to each other in relation to the connector metal bracket 40. Further, as shown in FIG. 13B, the external-interface flexible-printed-wiring board 23 led from the connector module 5 is connected to the control board 21 of the frame built-in module 4, and the cushion material C4 is bonded to the power supply board 22.

Figure 14A:
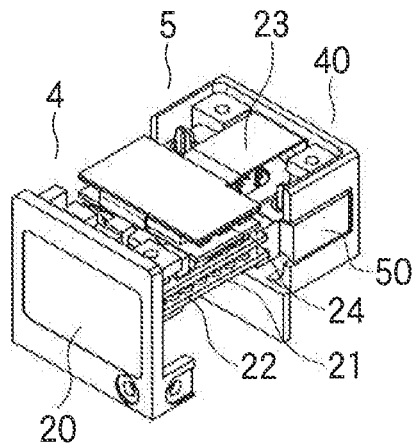
FIG. 14A is an exploded perspective view showing the assembly procedure where the external interface cable is led from the face part of the housing, according to the embodiment.
Figure 14B:
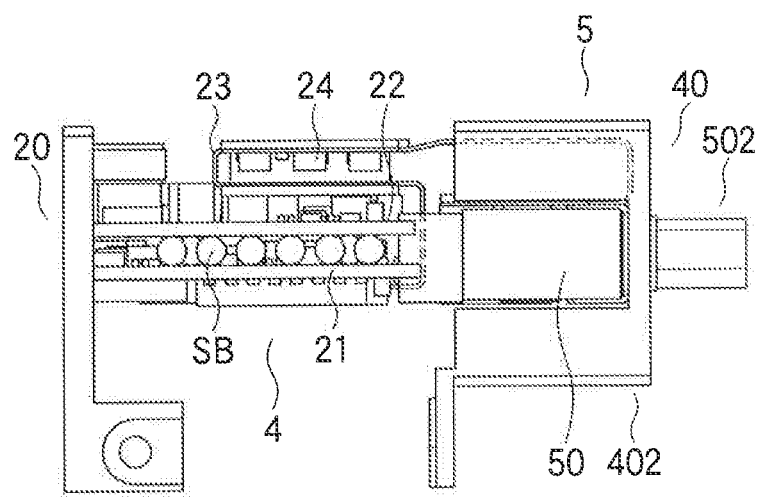
FIG. 14B is an exploded perspective view showing the assembly procedure where the external interface cable is led from the face part of the housing, according to the embodiment.
Figure 15:
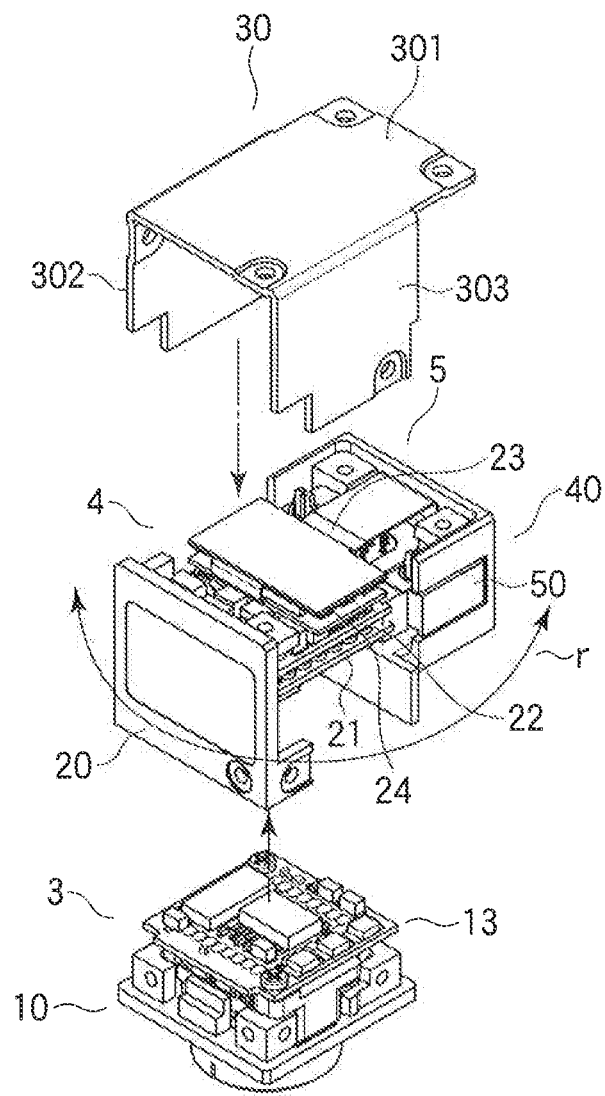
FIG. 15 is an exploded perspective view showing the assembly procedure where the external interface cable is led from the face part of the housing, according to the embodiment.

Subsequently, the external-interface flexible-printed-wiring board 23, which circuits and connects the frame built-in module 4 and connector module 5, is folded as shown in FIGS. 14A and 14B. As shown in FIG. 15, the lens-mount built-in module 3 is mounted in the frame built-in module 4. The tri-face cover 30 is fixed with screws to the lens-mount built-in module 3, frame built-in module 4, and connector module 5. In this assembly step, depending on which of right, left, upper, and lower faces of the camera housing 1 the external interface connector 50 is to be provided on, the frame built-in module 4 is pivoted in units of 90 degrees about a vertical axis parallel to the optical axis O1 (arrow direction r in the figure), to form a desired side-cable-lead assembly structure. In this case, the sensor-circuit flexible-printed-wiring board 25 is of a length which allows the board 25 to be folded a plurality of times. With the lens-mount built-in module 3 and frame built-in module 4 circuited and connected, the cable lead direction of the camera housing 1 can be arbitrarily changed to any of the right, left, upper, and lower side faces.

On a surface of the board mount frame 20 forming a face part of the camera housing 1, the control board 21 and power supply board 22 are supported to stand as the POP board. In any of the back-cable-lead assembly structure and side-cable-lead assembly structure, the POP board described above is mounted in the same array as the sensor board 15 built in the lens-mount built-in module 3 in a manner that these boards are layered on each other. Therefore, a board mount space for the imaging chamber 2 can be suppressed to minimum.

Further, a structure of the POP board is configured to be robust against thermal deformation and pressure deformation by using a barrel-type resin-core solder ball SB, without connecting the control board 21 and power supply board 22 by a connector. In this manner, a circuit connection is made, maintaining the control board 21 and power supply board 22 stable for a long period, and the boards are integrated rigidly at a set constant gap.

The sensor board 15, control board 21, and power supply board 22 can be mounted in the imaging chamber 2 of the microcamera housing 1 of an approximately 20 mm square by a means for mounting the sensor board 15 and POP board in the same array in both of the back-cable-lead assembly structure and side-cable-lead assembly structure, and by the POP board structure using the barrel-type resin-core solder ball SB.

As has been described above, according to the embodiment of the invention, a mount face to which an external interface connector is attached can be switched to an arbitrary face (back, right, left, upper, or lower face) among five faces of the box-type camera housing 1 excepting a front face thereof. In this manner, a leading direction of an external interface cable can be directed in an arbitrary direction among five directions, i.e., a back leading direction parallel to an optical axis of the camera, and right, left, upper, and lower side leading directions perpendicular to the optical axis of a camera. Accordingly, there is provided a small industrial electronic imaging camera comprising a connection mechanism for an external interface cable, with high general versatility with an economically advantageous configuration, which can be easily assembled by arbitrarily selecting a leading direction of the external interface cable.

The present invention is not limited just to the embodiment described above but various camera assembly structures can be achieved by modifying constitutive elements without deviating from the spirit of the invention.

REFERENCE SIGNS LIST

1 . . . Camera housing, 2 . . . Imaging chamber, 3 . . . Lens mount built-in module, 4 . . . frame built-in module, 5 . . . Connector module, 6 . . . Connector container chamber, 10 . . . Lens mount, 11 . . . O-ring, 12, . . . Shim, 13 . . . Solid-state imaging element (CCD), 14 . . . Device holder, 15 . . . Sensor board, 20 . . . Board mount frame, 21 . . . Control board, 22 . . . Power supply board, 23 . . . External-interface flexible-printed wiring board, 24 . . . IC component, 25 . . . Sensor circuit flexible-printed-wiring board, 30 . . . Tri-face cover, 40 . . . Connector metal bracket, 41 . . . Clamp screw with lock terminal, 50 . . . External interface connector, 101 . . . Imaging window, 102 . . . Lens frame part, 103 . . . Top mark, 401 . . . Bracket fixing piece, 402 . . . Extended part, 403 . . . Connector-terminal lead hole, 501 . . . Body part (connector body), 502 . . . External connection terminal, 503 . . . Connection end surface, O1 . . . Optical axis

What is claimed is:

1. A small industrial electronic imaging camera comprising:
   a lens mount which comprises an imaging window and forms a front face part of a box-type camera housing having a hexahedral structure wherein the hexahedral structure also has a back face part formed in a plane parallel to the plane in which the lens mount is formed;
   a tri-face cover having a U cross-section and which is configured to be attached to the lens mount with edges switched in relation to edges of the lens mount about a vertical axis parallel to an optical axis of the imaging window, and is configured to be assembled in two or more configurations including at least a first configuration in which the tri-face cover forms arbitrary three side face parts of the camera housing excluding a back face part and a second configuration in which the tri-face cover forms arbitrary two side face parts and a back face part of the camera housing;
   a board mount frame which comprises a board mount mechanism containing and supporting a plurality of boards in an imaging chamber formed in the camera housing, and is attached to the lens mount thereby forming an arbitrary face part of the camera housing;
   a connector metal bracket which is attached to the lens mount and forms an arbitrary side face part of the back face part of the camera housing; and
   an external interface connector which comprises an external connection terminal for connecting an external interface cable, and is attached to the connector metal bracket, with the external connection terminal exposed to outside the camera housing.

2. The small industrial electronic imaging camera of claim 1, wherein
   the connector metal bracket is provided with an extended part for containing the external interface connector;
   the tri-face cover is formed in such a manner that an intermediate face part of the tri-face cover includes a protruding face part protruding in one direction beyond two side face parts, and
   the protruding face part forms a cover of the extended part and a bracket fixing piece for the connector metal bracket.

3. The small industrial electronic imaging camera of claim 2, wherein
   a cable connection direction of the external connection terminal is parallel to the optical axis when the connector metal bracket forms the back face part of the camera housing, and the cable connection direction of the external connection terminal is perpendicular to the optical axis when the connector metal bracket forms any of right, left, upper, and lower side face parts of the camera housing.

4. The small industrial electronic imaging camera of claim 3, wherein
   when the connector metal bracket forms the back face part of the camera housing, the connector metal bracket is fixed with screws to the lens mount through the board mount frame, and is also fixed with screws through the tri-face cover, and
   when the connector metal bracket forms any of the right, left, upper, and lower side face parts of the camera housing, the connector metal bracket is directly fixed with screws to the lens mount, and is also fixed with screws to the lens mount through the tri-face cover and the board mount frame.

5. The small industrial electronic imaging camera of claim 4, wherein the lens mount comprises a lens frame part added with a top mark about the imaging window on a face thereof, and two screw holes parallel to two edges perpendicular to each other, at four corners of four edges on a back face, and the imaging chamber is formed by fixing with screws the lens mount, the board mount frame, the tri-face cover, and the connector metal bracket to each other using eight screw holes.

* * * * *